United States Patent Office 2,911,444
Patented Nov. 3, 1959

2,911,444

HYDROGENATION OF ESTERS OF PERFLUORINATED DICARBOXYLIC ACIDS

Charles F. Baranauckas, Niagara Falls, N.Y., and Russell R. White, State College, Pa., assignors to Hooker Chemical Corporation, a corporation of New York No Drawing. Application November 29, 1957
Serial No. 699,455

8 Claims. (Cl. 260—633)

This invention relates to a process of hydrogenating the esters of perfluorinated dicarboxylic acids such as perfluoroglutaric, perfluoroadipic, perfluorosuccinic, etc. A further object of this invention is to define the reaction variables to permit the obtaining of the product, the corresponding diols, in high yields. The hydrogenation products of this process have demonstrated utility in fluorine containing elastomers.

The catalytic hydrogenation of alkyl esters of fluorocarbon acids ($CnF_{2n+1}$ COOR) using a copper chromium oxide catalyst containing a trace of barium oxide at elevated temperatures and pressures to yield the 1,1-dihydro perfluoro alcohols is disclosed in British patent specification 760,769 (November 7, 1956). This hydrogenation process operates efficiently with only trace quantities of a promotor such as barium oxide or calcium oxide. It has been found much to our surprise that if the diester of a perfluorinated diacid is hydrogenated under the disclosed conditions little or no reduction occurs. The catalyst becomes inactive rapidly, and this loss of activity results in recovery of the starting diester and undesirable by-products. The object of our invention is to provide conditions such that the hydrogenation of the diesters proceeds essentially to completion to the corresponding $\alpha,\alpha,\omega,\omega$-tetrahydro perfluoro diols without the loss of catalytic activity by the copper-chromium oxide.

We have found that the diesters of perfluorinated diacids can be successfully hydrogenated with a copper-chromium oxide catalyst at temperatures of 130–250 degrees centigrade, and pressures of 700–3500 p.s.i. gauge provided that calcium oxide or barium oxide is present in amounts equivalent to 100–400 mol percent of the ester.

It is a further object of this invention to isolate the $\alpha,\alpha,\omega,\omega$-tetrahydro perfluorinated diols in high yields. In the case of diethylhexafluoroglutarate yields of 1,1,5,5-tetrahydro hexafluoropentane 1,5-diol of the order of 82–95 percent are readily isolated from the reduction mixture.

It is a further object of our invention to provide a method for producing $\alpha,\alpha,\omega,\omega$-tetrahydroperfluorinated diols in an economical manner of a quality suitable for use in making fluorine containing elastomers.

In general the process of this invention is carried out by catalytically hydrogenating esters of perfluorinated dicarboxylic acids, at elevated temperatures and pressures and in the presence of at least 100 mol percent ester equivalent of calcium oxide or barium oxide. The perfluorinated diester is placed in a high pressure reaction vessel along with the desired quantities of copper chromite catalyst, calcium oxide or barium oxide and a solvent such as cyclohexane or diisopropyl ether, and hydrogen. The term copper chromite catalyst is used interchangeably with copper chromium oxide catalysts. Other dialkyl esters of perfluorinated dicarboxylic acids may be employed, the dibutyl, diisopropyl and dimethyl esters for example. A variety of copper chromite (copper chromium oxide) catalysts are suitable for this use including those containing barium oxide. Diisopropyl ether is preferred over cyclohexane as a solvent as the former has greater solvent power for the product and thus facilitates removal of the product from the copper chromite catalyst, calcium oxide or barium oxide mixture. In addition other solvents can be used in the reduction and some of the chemicals suitable are presented for purposes of illustration only, and are as follows: methylcyclohexane, n-hexane, n-heptane, tetrahydrofuran, dioxan, diethyl ether, di-n-butyl ether, etc. The main function of the solvent is to increase the fluidity of the reaction mixture and to aid in the desorption of the reaction product from the catalyst surface. The pressure vessel is then placed in a rocking device to provide agitation of the reaction mixture and heated to the desired temperature. When the hydrogenation is essentially complete the vessel is cooled, vented and discharged. The reaction solvent or some other solvent such as diethyl ether may be used to assist the discharging of the materials from the vessel and to remove the product from the solids present. The solids are filtered off and the solvents are removed by distillation. The desired $\alpha,\alpha,\omega,\omega$-tetrahydroperfluorodiol crystallizes out and is then purified by recrystallization from a suitable solvent such as benzene or a benzene-ethyl acetate mixture.

Prior to this invention the reduction of the diesters of perfluorinated acids has been effected by chemical means with such reagents as lithium aluminum hydride. For example, hexafluoropentanediol has been prepared by the lithium aluminum hydride reduction of diethylhexafluoroglutarate, as disclosed by E. T. McBee, W. F. Marzluff, O. R. Pierce in J.A.C.S., 74, 444 (1952). The equation for this reaction is:

$$CH_3-CH_2-O\overset{O}{\overset{\|}{C}}-CF_2-CF_2-CF_2-\overset{O}{\overset{\|}{C}}-OCH_2-CH_3 + 2LiAlH_4 \longrightarrow$$
$$HOCH_2-CF_2-CF_2-CF_2-CH_2OH + 2CH_3CH_2OH + 2LiOH + 2Al(OH)_3$$

Such chemical reducing agents are expensive, and even though excellent for small scale preparations often cause the economics to become unfavourable for large scale commercialization.

The copper chromite-catalyzed, high pressure hydrogenation of diethyl hexafluoroglutarate was attempted following the procedure for the hydrogenation of alkyl esters of monobasic fluorocarbon acids as disclosed in British Patent 760,769 (November 7, 1956). A pressure vessel was charged with 148 grams (0.5 mole) of diethyl hexafluoroglutarate, 29.5 grams of copper chromite catalyst containing 10 percent by weight of barium oxide (Harshaw catalyst CU0401P), and hydrogen to 2200 p.s.i. gauge pressure. The vessel and its contents were heated to 200 degrees centigrade for 8 hours and then cooled and the contents discharged. On separation of the catalyst from the reaction product it was found that only unreacted starting material and undesirable by-products remained.

Among the esters of perfluorinated dicarboxylic acids which may be hydrogenated in accordance with the teachings of this invention to obtain the corresponding diols are compositions having the following formulae:

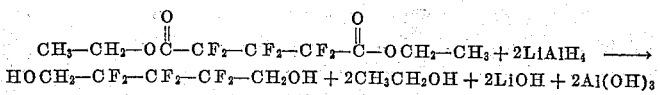

where $n$ is an integer from 1 to 10, and R is an alkyl or cycloalkyl radical, and

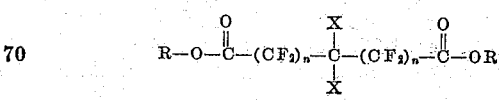

where X is selected from the group consisting of fluorine, perfluoroalkyl and perfluoro-cycloalkyl, where n is an integer from 1 to 7 and R is an alkyl or cycloalkyl radical.

Among the esters that can be reduced to diols as per our invention are: diethyl, 2,2,3,4,4-pentafluoro-3-trifluoromethyl glutarate, diethyl hexafluoroglutarate, diisopropylhexafluoroglutarate, diethyloctafluoroadipate, diethyltetrafluorosuccinate, di-n-butyl hexafluoroglutarate; di isopropyl difluoromalonate; di-n-butyl 2,2,3,4,4-pentafluoro-3-pentafluoroethyl glutarate, etc. These are set forth for illustration purposes only and are not deemed to be limiting as other esters of perfluoroinated diacids are also operable.

Still further objects and advantages of the present invention will appear from the more detailed description and examples set forth below, it being understood that this more detailed description and examples are given by way of illustration and explanation only, and not by way of limitation, since various changes therein may be made by those skilled in the art, without departing from the scope and spirit of the present invention.

EXAMPLE 1

An 800 ml. stainless steel rocking autoclave was charged with 88.8 grams (0.3 mole) of diethyl hexafluoroglutarate, 21 grams of copper chromium oxide (Harshaw catalyst CU1800P), 36.5 grams (216 mole percent of ester) of calcium oxide, 300 mls. of diisopropyl ether, and hydrogen to 2000 p.s.i. gauge pressure. The reactants were heated to 150–160 degrees centigrade, for five hours when the hydrogen pressure was constant indicating complete reaction. The autoclave was cooled, vented and discharged. The solids were filtered off and the autoclave and solids washed with diisopropyl ether. The filtrate and the washings were combined and the solvent removed by distillation. The yield of hexafluoropentanediol was 60 grams or 94.3 percent of the theoretical yield.

EXAMPLE 2

The autoclave was charged with 106 grams (0.3 mole) dibutyl hexafluoroglutarate, 21 grams of copper chromium oxide catalyst, Harshaw CU1106P which contains 10 percent barium oxide, 40 grams (240 mole percent ester) of calcium oxide, 300 mls. of cyclohexane, and hydrogen to a pressure of 2000 p.s.i. gauge. After five hours reaction at 150–160 degrees centigrade, the autoclave was cooled, vented and the contents discharged with aid of diethyl ether. The solids were filtered off and extracted with diethyl ether. The extract and filtrate were combined and the solvents removed by filtration. The crude product was recrystallized from benzene to give 52.5 grams, 82.5 percent of hexafluoropentanediol.

The following example is set forth to illustrate the importance of choosing proper solvents when carrying out the reactions of this invention. Ethanol, which is a common hydrogenation solvent, is entirely unsuitable for our process.

EXAMPLE 3

The autoclave was charged with 88.3 grams (0.3 mole) of diethyl hexafluoroglutarate, 21 grams of copper chromium oxide catalyst, Harshaw CU1800P, 36.5 grams, (216 mole percent ester) of calcium oxide, 300 mls. of absolute ethanol, and hydrogen to 2000 p.s.i. gauge pressure. After a reaction time of four hours the clave was cooled, vented and discharged. There was evidence of degradation of the catalyst and no diol could be isolated.

The following Table I with Examples 4 to 13 further illustrates the various features of this invention.

*Table I.—Hydrogenation of dialkyl hexafluoroglutarates*

| Ex No. | Ester | Quantity Ester | | Catalyst | grams | Wt. percent Ester | Calcium-Oxide | | Solvent | mls. | Reaction time, hrs. | Reaction temp., °C. | Pressure, p.s.i. | Yield of Diol | |
|---|---|---|---|---|---|---|---|---|---|---|---|---|---|---|---|
| | | g. | Moles | | | | g. | mole percent ester | | | | | | g. | Percent |
| 4 | Dibutyl | 106 | 0.3 | CU1800P | 21 | 20 | 36.5 | 216 | C₆H₁₂ | 300 | 12 | 160 | 700–900 | 37 | 58.2 |
| 5 | do | 106 | 0.3 | CU1800P | 21 | 20 | 36.5 | 216 | C₆H₁₂ | 300 | 6.25 | 160 | 1,700–1,900 | 39 | 61.5 |
| 6 | do | 106 | 0.3 | CU1800P | 21 | 20 | 36.5 | 216 | C₆H₁₂ | 300 | 4 | 160 | 2,730 | 58 | 91.3 |
| 7 | Diethyl | 88.8 | 0.3 | CU1800P | 21 | 23.4 | 18.2 | 108 | Diisopropyl ether | 300 | 6.5 | 160 | 2,700 | 39 | 61.3 |
| 8 | do | 88.8 | 0.3 | CU1800P | 21 | 23.4 | 36.5 | 216 | C₆H₁₂ | 300 | 5 | 160 | 2,300 | 57 | 89.6 |
| 9 | do | 148 | 0.5 | CU1106P | 29.6 | 20 | 67 | 240 | C₆H₁₂ | 100 | 4 | 250 | 2,000 | 36 | 34 |
| 10 | do | 88.8 | 0.3 | CU1800P | 21 | 23.4 | 73 | 432 | Diisopropyl ether | 300 | 5.2 | 160 | 2,270 | 61 | 95.9 |
| 11 | Dibutyl | 176 | 0.5 | CU1106P | 35 | 20 | 67 | 240 | C₆H₁₂ | 200 | 4 | 200 | 2,050 | 63 | 60 |
| 12 | do | 106 | 0.3 | CU1800P | 21 | 20 | 40 | 240 | C₆H₁₂ | 300 | 8 | 160 | 2,070 | 52 | 82 |
| 13 | do | 106 | 0.3 | CU1106P | 21 | 20 | 40 | 240 | C₆H₁₂ | 300 | 8 | 160 | 2,000 | 53 | 83 |

EXAMPLE 14

Diethyl hexafluoroglutarate was hydrogenated following the procedure described in Example 1, with the exception that the catalyst was prepared by the procedure of Folkers and Connor (J. Am. Chem. Soc., 54, 1138 (1932)), in which copper ammonium chromate was decomposed by heat and the resulting black copper-chromium oxide washed with dilute acetic acid and water and then dried. Using catalyst so prepared 0.3 mole of diethylhexafluoroglutarate was hydrogenated to yield 55.5 grams (87.2 percent) of hexafluoropentane diol.

EXAMPLE 15

A mixture of 73.8 grams (0.3 mole) of diethyltetrafluorosuccinate, 36.5 grams (216 mole percent of ester) of calcium oxide, 21 grams of copper chromite catalyst (Harshaw CU1800P) and 300 mls. of cyclohexane was placed in a rocking-type autoclave which was then charged to a pressure of 2150 p.s.i. with hydrogen. The reaction mixture was maintained at a temperature of 155 to 165 degrees centigrade for 5 hours under a minimum hydrogen pressure of 2100 p.s.i. The clave was discharged and the reaction mixture worked up. The crude product was recrystallized from benzene to yield 39.5 grams (81 percent of theory) of 2,2,3,3-tetrafluorobutanediol, M.P. 83.5–84.5 degrees centigrade.

EXAMPLE 16

An autoclave was charged with 100.7 grams (0.3 mole) of diethyloctafluoroadipate, 36.5 grams calcium oxide, 21 grams of copper chromite catalyst (Harshaw CU-1800P), 300 mls. of cyclohexane, and hydrogen to 2030 p.s.i. The clave was heated to 155–165 degrees centigrade, and rocked for 6 hours during which time the hydrogen pressure was maintained above 1900 p.s.i. Discharge of the clave and work up of the reaction product gave octafluoropentane diol which was recrystallized from benzene-ethyl acetate mixture (10:1) to give 65.5 grams (83.5 percent of theory) M.P. 67–68 degrees centigrade.

The effect of variation in the proportion of calcium oxide or barium oxide in the reaction mixture is illustrated by Experiments 7, 8, and 10, listed in Table I. Increasing the proportion of calcium oxide from 108 mole percent ester to 216 mole percent ester increased the yield of diol from 61.3 to 89.6 percent. A further increase in the proportion percent calcium oxide had lesser incremental effect on the reaction as evidenced by the 95.9 percent yield obtained with 432 mole percent ester of calcium oxide.

It was found that the yield of diol obtained decreased with increase of reaction temperature above the desired 150–160 degrees centigrade. This is shown by Experiments 6, 9, 10, and 11.

Other types of copper chromite catalyst than those set forth in Table I were evaluated but no advantage resulted from their use. For example, both copper chromite catalysts CU1800P (Harshaw) containing 50 percent copper oxide and 47 percent chromium oxide and CU1106P (Harshaw) containing 40 percent copper oxide, 47 percent chromium oxide and 10 percent barium oxide were evaluated in Experiments 12 and 13 in which similar yields of diol were obtained.

The results of Experiments 4, 5, and 6, show that decrease in the pressure of hydrogen below the desired pressure results in increase in the reaction time and decrease of the yield.

α,α,ω,ω-Tetrahydro fluorinated diols, the end products of the process of this invention have found considerable utility as part of the polyester chain of fluorinated elastomeric compositions. These fluorinated elastomers in turn have been found to possess excellent stability at high and low temperatures and also excellent resistance to various types of solvents. For further disclosure of the utility of fluorinated elastomers of which these perfluorinated diols are a part, reference may be had to co-pending application S.N. 646,968, entitled "Fluorine Containing Elostomers" and filed March 19, 1957.

Having thus described our invention what we claim and desire to secure by Letters Patent is:

1. The process of hydrogenating esters of perfluorinated dicarboxylic acids to the corresponding α,α,ω,ω-tetrahydroperfluorodiol which comprises heating said esters to a temperature of between about 130 and 250 degrees centigrade in a hydrogen atmosphere at a pressure between about 700 and about 3500 pounds per square inch gauge in the presence of copper chromium oxide catalyst and also in the presence of a material selected from the group consisting of calcium oxide and barium oxide, said latter material being present in an amount equivalent to from about 100 to about 400 mole percent of the ester and in the presence of a solvent selected from the group consisting of cyclohexane, diisopropyl ether, methylcyclohexane, n-hexane, n-heptane, tetrahydrofuran, dioxan, diethyl ether and di-n-butyl ether.

2. The process of claim 1 wherein the copper chromium oxide catalyst is employed in amounts between about 5 to about 40 weight percent of the starting ester material.

3. The process of claim 1 wherein the esters of perfluorinated dicarboxylic acids employed are selected from compositions having the following formulae:

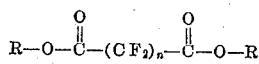

where $n$ is an integer from 1 to 10 and R is selected from the group consisting of alkyl and cycloalkyl hydrocarbon radicals; and

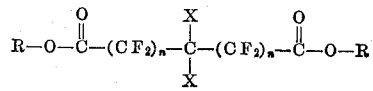

where X is selected from the group consisting of fluorine, perfluoroalkyl and perfluorocycloalkyl and wherein at least one of the Xs is selected from the group consisting of perfluoroalkyl and perfluorocycloalkyl; $n$ is an integer from 1 to 7 and R is selected from the group consisting of alkyl and cycloalkyl radicals.

4. The process of claim 3 wherein the starting ester is diethylhexafluoroglutarate.

5. The process of claim 3 wherein the starting ester is diisopropylhexafluoroglutarate.

6. The process of claim 3 wherein the starting ester is di-n-butylhexafluoroglutarate.

7. The process of claim 3 wherein the starting ester is diethyloctafluoroadipate.

8. The process of claim 3 wherein the starting ester is diethyltetrafluorosuccinate.

References Cited in the file of this patent

UNITED STATES PATENTS

| | | |
|---|---|---|
| 1,746,783 | Lazier | Feb. 11, 1930 |
| 2,040,944 | Lazier | May 19, 1936 |
| 2,094,611 | Lazier | Oct. 5, 1937 |
| 2,666,797 | Husted et al. | Jan. 19, 1954 |

OTHER REFERENCES

Folkers et al.: J.A.C.S., vol. 54, pp. 118–47, 1153 (1932).

Adkins et al.: J.A.C.S., vol. 70, pp. 3121–5 (1948).